United States Patent [19]

Ohmura

[11] Patent Number: 4,646,462
[45] Date of Patent: Mar. 3, 1987

[54] CASTING HANDLES
[75] Inventor: Ryuichi Ohmura, Shizuoka, Japan
[73] Assignee: Fuji Kogyo Co., Ltd., Japan
[21] Appl. No.: 729,932
[22] Filed: May 3, 1985
[30] Foreign Application Priority Data
  May 14, 1984 [JP] Japan ................................ 59-96180
[51] Int. Cl.⁴ ...................... A01K 87/00; A01K 87/06
[52] U.S. Cl. .......................................... 43/23; 43/18.1
[58] Field of Search ................................... 43/18.1, 23
[56] References Cited
  U.S. PATENT DOCUMENTS
  911,119  2/1909  Farr ...................................... 43/18.1
  1,013,333 1/1912  Tredwell .................................. 43/23
  3,034,798 5/1962  Portz ...................................... 43/23
  3,197,908 8/1965  Hirsch ..................................... 43/23
  4,398,369 8/1983  Wiebe ................................... 43/18.1
  4,516,351 5/1985  Highby ................................. 43/18.1
  4,520,587 6/1985  Wallace ................................ 43/18.1

Primary Examiner—M. Jordan
Attorney, Agent, or Firm—Wegner & Bretschneider

[57] ABSTRACT

Novel blank-through casting handles are disclosed. The casting handle is to integrate a body and a grip into one united member by concave-convex engagement, said body and grip being separately bonded to a rod in the prior art, whereby the thus engaged portion serves to receive the torsional force to prevent it from acting upon a bonding layer. The bore of the reel mount and recession, and the bore of the handle grip and projection are eccentric with respect to the reel mount and handle grip.

6 Claims, 4 Drawing Figures

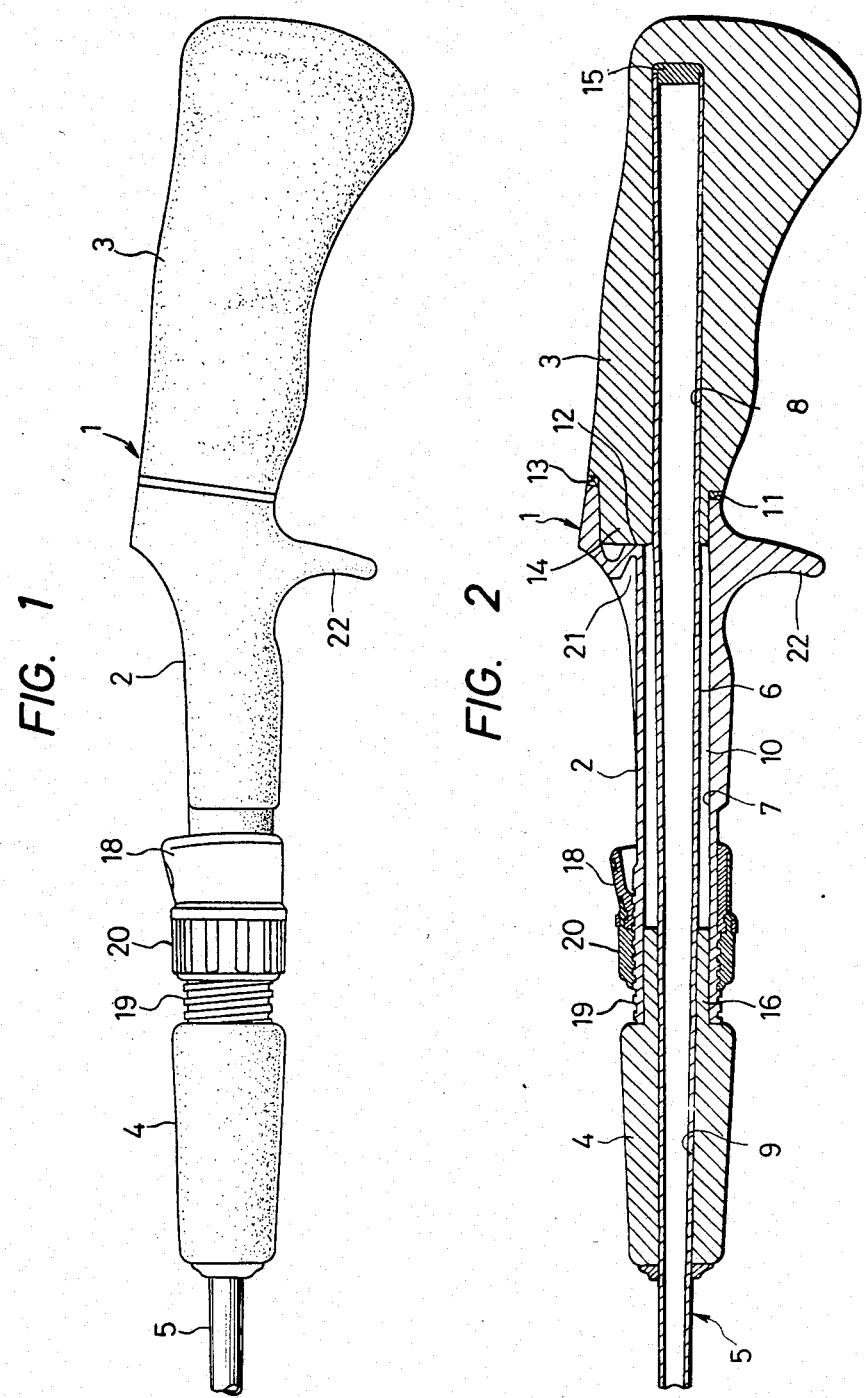

CASTING HANDLES

FIELD OF THE INVENTION

The present invention relates to casting handles and more particularly, to improvements in blank-through handles.

BACKGROUND OF THE INVENTION

In the prior art casting handles of casting rods, there are available so-called blank-through casting handles including a body A and a separate grip B, each being glued onto a rod E respectively. Such handles, however, frequently become useless due to easy disconnection of bonded parts during use.

The present inventor has paid attention to the fact that this disconnection resides in a new casting technique, and can not be eliminated only by an increase in the bondage strength.

According to the conventional way of casting, the direction of thumb force on the spool for braking is the same with the direction of rod swing for casting. In this version of casting, however, there is no prior problem, but the handle often slip out from the hand when releasing the line.

To release the line, the thumb pressure must be off from the spool, although the rod is only supported by four fingers which grips the handle from below.

In recent years, there has been developed a new way of casting to solve the afore mentioned slip out problem by placing the palm of hand on the upper side of the rod (on the handle) when the fishing line is released. In this version of casting, the thumb and the spool are positioned on the side of the rod, and there is better control of the spool, but, since the thumb is the main saurce of power for swing, the user must give a strong force in the direction of swing which creates a turning force on the reel and body respect to the rod.

It goes without saying that the remaining four fingers firmly hold the grip as a counter force for preventing such turning. In other words, the body and the grip will be strongly twisted at each casting. The adhesion of the grip or body or rod could not bear for several hundred castings per day by a fishermen.

In order to solve the afore mentioned problem, the present invention is to integrate a body and a grip into one united member by a concave-convex engagement provided with off-centered common rod bores (said body and grip being separately bonded to a rod in the prior art) whereby the engaged portion receives the twisting force to prevent it acting upon a bonding layer.

SUMMARY OF THE INVENTION

The present invention provides a novel blank-through casting handle, comprising a body to which a reel is to be mounted, a grip made separately from said body, said body having a recession on its end adjacent to the grip, said grip having a projection on its end to be tightly engaged within said recession, and common bores for a fishing rod provided in said body and said grip, said bores being eccentric or the projection of said grip.

BRIEF DESCRIPTION OF THE DRAWINGS

The above-mentioned and other objects and features of the present invention will become apparent from the following detailed explanation with reference to the accompanying drawings, in which:

FIG. 1 is a side view showing one embodiment of the casting handle of the present invention, which is fixed to a fishing rod;

FIG. 2 is a longitudinal section view of FIG. 1;

DETAILED DESCRIPTION OF THE PREFERRED EMBODIMENTS OF THE INVENTION

Figure 3:
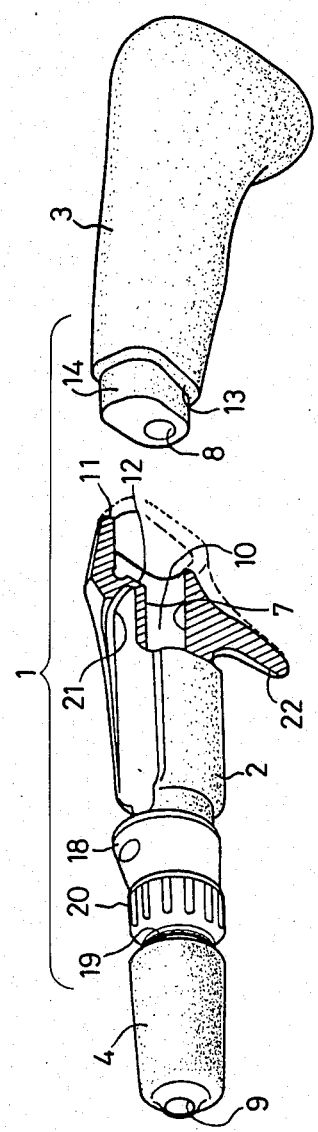
FIG. 3 is an exploded perspective view, partly sectioned, of the casting handle illustrated in FIG. 1.
Figure 4:
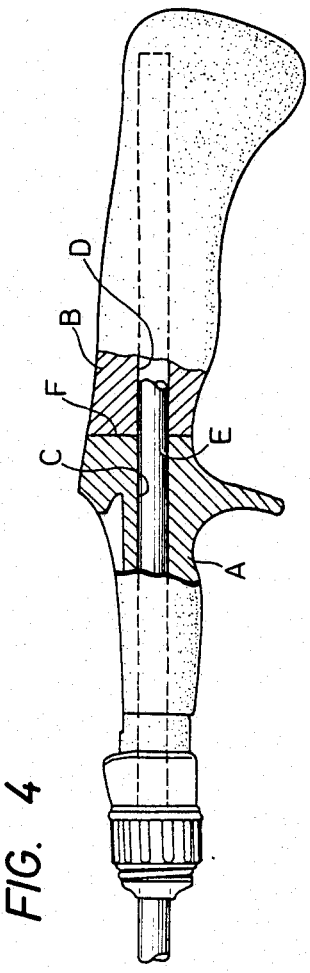
FIG. 4 is a side view, partly sectioned, of the conventional casting handle.

Referring now to FIGS 1 to 3 inclusive, a casting handle shown generally at 1 comprises a hollow body 2 which is formed of hard synthetic resin, and to which a reel is to be attached, a grip 3 adjacent to the body 2 which is formed of an elastic material such as foamed synthetic resin or cork, and a front grip 4 of a similar material. The body 2 and the grips 3 and 4 are provided therethrough with common bores 7, 8 and 9 through which the butt portion 6 of a fishing rod 5 is fixedly inserted. It is noted that the bore 7 in the body 2 also serves as a hollow portion 10.

As best shown in FIG. 3, the body 2 is provided with a recession 12 in the end portion 11 thereof and the grip 3 is provided with a projection 14 which extends from the end portion 13 thereof and is to be tightly fitted in the recession 12.

The bore 7 is eccentric with respect to the recession 12, and the bore 8 is eccentric with respect to the projection 14.

In transverse section the recession 12 and the projection 14 may be of, any desired shape such as oval, round or rectangular shape.

In the illustrated embodiment, the butt portion 6 of the fishing rod 5 is larger diameter than the fore portion thereof. However, it is possible to fit the front grip 4, the body 2 and the grip 3 over the butt portion 6 of the fishing rod 5 having premounted guides (not shown), since the bores 8 and 9 in the grips 3 and 4 can increase in diameter by elastic deformation. This is due to the fact that, as already mentioned, the grips 3 and 4 are formed of an elastic material, and the hollow portion 10 in the body 2 also serves as a bore for inserting therethrough the fishing rod 5.

In the state as illustrated in FIGS. 1 and 2, the grips 3 and 4 are bonded to the fishing rod 5 on the bores 8 and 9 and the body 2 and the grip 3 are fixedly bonded together at the engagement portion of the grip and body. Grip 4 has a projection 16 to plug into bore 7.

As will be evident from FIG. 2, the bore 8 in the grip 3 extends almost to the end of the grip 3.

As well-known in the art, the body 2 is formed with a movable sleeve 18 for receiving one foot of a reel, a threaded portion 19 to be in threaded engagement with a nut 20, a cavity 21 for receiving the other foot of the reel, and a finger grip 22.

It is understood that, in the illustrated embodiment, the recession and the projection may be formed oppositely.

As explained in detail, the bores for fixedly inserting the fishing rod therethrough are positioned eccentrically with respect to the concave-convex engagement structure between the body and the grip in accordance with the present invention. Thus, when the fishing rod is inserted in the bores and bonded to the body and the grip, there is no fear of turning of the body and the grip by a bolt effect of the rod, even though the recession and the projection may be a round shape in transverse section. Thus, it is possible to prevent the moment of rotation of larger magnitude from acting upon the bonding layer of the body and grip with respect to the fishing rod and, hence, prevent both body and grip from rotating or otherwise shifting with respect to the fishing rod in a satisfactory manner.

What is claimed is:

1. A casting handle for a fishing rod comprising:

(A) a body to which a reel is to be mounted, said body having a longitudinal bore therethrough and a recession at one end thereof;

(B) a grip made separately from said body, having a longitudinal bore therein and a projection at one end thereof, said projection mating with said recession to tightly engage therewith;

(C) said bores being coaxial when said projection and recession are engaged and eccentric with respect thereto, to receive one end portion of said fishing rod.

2. A casting handle according to claim 1, wherein said bore of said body has a larger diameter than said bore of said grip to form a hollow therein.

3. A casting handle according to claim 2, further comprising a front grip having a longitudinal bore therethrough, said front grip having a projection at one end for insertion in said bore of said body at the other end thereof.

4. A casting handle according to claim 3, wherein said one end portion of said fishing rod is tapered from a narrower diameter to a larger diameter at the end thereof said grip and said front grip are made of a resilient material, and said bore of said grip has a larger diameter than said bore of said front grip.

5. A casting handle according to claim 2, wherein said bore of said grip extends most of the way therethrough.

6. In combination, the handle of claim 2 and a fishing rod.

* * * * *